THOMAS GRAY, OF LONDON, ENGLAND.

Letters Patent No. 83,707, dated November 3, 1868; patented in France, June 30, 1868.

IMPROVEMENT IN PREPARING RESIN-SIZE FOR USE IN PAPER-MAKING.

The Schedule referred to in these Letters Patent and making part of the same.

*To all whom it may concern:*

Be it known that I, THOMAS GRAY, of London, in the Kingdom of England, have invented an Improved Method of Preparing Rosin-Size for Use in Paper-Making and other purposes; and I do hereby declare that the following is a full, clear, and exact description of the same.

My invention consists in producing a rosin-size, applicable to manufacturing paper, and to other uses.

First, I treat the rosin as follows:

Operating on any quantity of rosin, say eight hundred pounds, I throw into a copper or sheet-iron boiler forty gallons of water.

I dissolve into it, in heating, about seventy pounds of salt of soda, or other alkaline salt, having care to agitate and stir the mixture till perfect dissolution of the alkaline salt occurs.

When this result is attained, I add, gradually, and by small quantities, the rosin, stirring on the material, and waiting till all is completely dissolved, before throwing in any more.

When the whole is thoroughly mixed, I turn the steam off, and the first operation being over, I proceed on the next operation, or preparing the size.

Having previously dissolved forty pounds of salt (chloride of sodium) in fifty gallons of cold water, I now take a boiler twice or three times more capacious than that used for preparing the rosin.

I pour in, together with the rosin, yet hot, half part of the salt water prepared, in adding thereto thirty gallons, about, of cold water.

I apply heat, stirring the mixture by means of a spattle, and soon obtain a homogeneous, whitish mass.

I proceed on stirring until the mixture assumes a very intense dark color, much like to that of wine, which change is produced by the perfect union of the prepared rosin and the salt at that moment.

I let the mixture rest, which settles at the bottom of the boiler, when I decant, (cast off the liquid part,)

Then I add some cold water again, and the remainder of salt water.

I allow the matter to settle again, and decant as precedently, when the size is now ready for use.

The following are the advantages resulting from my process:

First, the size thus obtained will readily dissolve in cold water, although tepid water is preferable.

Second, it will not adhere to the sides of the boiler or other recipients, whether it is hot or cold.

Third, at the state of solution it is white, and will continue so when applied to paper or other substance.

Fourth, in paper it will preserve its hue, even in contact of hot cylinders.

Fifth, my method of preparing size will save time, cost, and material.

Sixth, the eradication of the essence of turpentine and alkali will allow diminishing the proportion of alum which is generally added to size.

Seventh, the color or hue of the paper will be greatly improved, and the sizing of the same prove more regular and uniform.

I claim as new, and desire to secure by Letters Patent—

1. The improved process for making size, by first bleaching the rosin in a solution of warm water and salt of soda, or other alkaline salt, and mixing the same with a solution of chloride of sodium, under the conditions substantially as and for the purpose specified.

2. Size prepared by the herein-described process, as a new article of manufacture, substantially as and for the purpose specified.

THOMAS GRAY.

Witnesses:
G. F. WARREN, } Both of No. 17 Gracechurch
THOS. BROWN. } Street, London.